United States Patent [19]

Garcés et al.

[11] Patent Number: 5,599,520
[45] Date of Patent: Feb. 4, 1997

[54] SYNTHESIS OF CRYSTALLINE POROUS SOLIDS IN AMMONIA

[76] Inventors: Juan M. Garcés, 1106 W. Sugnet, Midland, Mich. 48640; Dean M. Millar, 1101 Adams Dr., Midland, Mich. 48642; Kevin E. Howard, 1015 Whispering Oak Dr., Midland, Mich. 48642

[21] Appl. No.: 333,670

[22] Filed: Nov. 3, 1994

[51] Int. Cl.⁶ .......................... C01B 39/02; C01B 33/21
[52] U.S. Cl. .......................... 423/700; 423/705; 423/326; 423/328.1; 423/330.1
[58] Field of Search .................. 423/700, 701, 423/702, 703, 704, 705, 326, 328.2, 330.1

[56] References Cited

U.S. PATENT DOCUMENTS

| | | | |
|---|---|---|---|
| 2,958,578 | 11/1960 | Baker | 423/326 |
| 3,308,069 | 3/1967 | Wadlinger et al. | 502/62 |
| 3,758,539 | 9/1973 | Flank | 423/710 |
| 3,965,042 | 6/1976 | Feldwick et al. | 502/263 |
| 4,039,479 | 8/1977 | Gembicki et al. | 502/64 |
| 4,242,233 | 12/1980 | Ball et al. | 423/705 |
| 4,264,473 | 4/1981 | Tu et al. | 502/64 |
| 4,300,012 | 11/1981 | Tu et al. | 585/470 |
| 4,304,686 | 12/1981 | Telford | 302/61 |
| 4,419,220 | 12/1983 | LaPierre et al. | 208/111 |
| 4,452,907 | 6/1984 | Ball et al. | 502/60 |
| 4,452,908 | 6/1984 | Ball et al. | 502/61 |
| 4,497,969 | 2/1985 | Ball et al. | 585/415 |
| 4,533,649 | 8/1985 | Ball et al. | 502/71 |
| 4,606,900 | 8/1986 | Kacirek et al. | 423/709 |
| 4,665,255 | 5/1987 | Chang et al. | 585/467 |
| 4,717,560 | 1/1988 | Vaughan | 423/712 |
| 4,806,329 | 2/1989 | Cho et al. | 423/339 |
| 4,840,929 | 6/1989 | Chen et al. | 502/74 |
| 4,853,203 | 8/1989 | Guth et al. | 423/705 |
| 4,871,701 | 10/1989 | Danner et al. | 502/62 |
| 4,923,690 | 5/1990 | Valyocsik et al. | 423/705 |
| 5,063,187 | 11/1991 | Burgfels et al. | 502/71 |
| 5,082,641 | 1/1992 | Popa et al. | 423/326 |
| 5,164,170 | 11/1992 | Rubin | 423/709 |
| 5,318,766 | 6/1994 | Vaughan et al. | 423/700 |
| 5,320,822 | 6/1994 | Ozin et al. | 423/700 |
| 5,401,486 | 3/1995 | Mueller et al. | 423/705 |
| 5,409,682 | 4/1995 | Mueller et al. | 423/704 |
| 5,435,988 | 7/1995 | Grebner et al. | 423/704 |

FOREIGN PATENT DOCUMENTS

| | | |
|---|---|---|
| 0307060 | 3/1989 | European Pat. Off. . |
| 5017122 | 1/1993 | Japan . |
| 2018232 | 10/1979 | United Kingdom . |

OTHER PUBLICATIONS

D. E. W. Vaughan et al., "Zeolite Synthesis in Ammonia and Aqueous Ammonia Solvents: Reactivity of Group IA Cations with Pre-Made Silica-Alumina Gels," *Proceedings of the 9th International Zeolite Conference, Montreal,* 1992, Eds. R. vonBallmoos et al., 1993 (No Month) Butterworth-Heinemann, pp. 197–206.
Derwent 93-054873/07 Jan. 1993.
Derwent 93/034046/04 Feb. 1992.
Derwent 92-167759/21 Dec. 1991.
Derwent 84-107987/18 Jan. 1984.
Derwent 84-152917/25 Feb. 1984.
Derwent 84-213785/35 May 1984.
Derwent 84-090990/15 Sep. 1983.
Derwent 73-34873U/24 Mar. 1973.
Derwent 14686 E/08 Jan. 1982.
Chemical Abstracts 118:237060n Mar. 1993.
Chemical Abstracts 120(2):11228c 1993 (No Month).
Chemical Abstracts 116:154872m 1992 (No Month).
U. Müller and W. Steck, "Ammonium-Based Alkaline-Free Synthesis of MFI-Type Boron-and Titanium Zeolites" in Zeolites and Related Microporous Materials State of the Art 1994 Part A, eds. J. Weitkamp et al., *Studies in Surface Science and Catalysis,* vol. 84, Elsevier, 1994, pp. 203–209 (No Month).
U. Håkansson and L. Fälth, *Acta. Crystallographica,* C46, 1363–1364 (1990)(No Month).
R. von Ballmoos and J. B. Higgins, *Collection of Simulated XRD Powder Patterns for Zeolites,* Betterworth-Heinemann, 1990, 406S–407S, 478S–479S, and 514S (No Month).
J. M. Newsam, M. M. J. Treacy, W. T. Koetsier, and C. B. de Gruyter, *Proceedings of the Royal Society of London,* A420, 375–405 (1988) (No Month).
Ch. Baerlocher and W. M. Meier, *Zeitschrift für Kristallographie,* Bd. 135, S. 339–354 (1972)(No Month).
R. M. Barrer and P. J. Denny, *Journal of the Chemical Society,* 971–982 (1961). (No Month).
R. M. Barrer and P. J. Denny, *Journal of the Chemical Society,* 983–1000 (1961). (No Month).
R. M. Barrer and D. E. Mainwaring, *Journal of the Chemical Society,* Dalton, 2534 (1972)(No Month).
R. Aiello and R. M. Barrer, *Journal of the Chemical Society* (A), 1470(1970). (No Month).
R. Szostak, *Molecular Sieves: Principles of Synthesis and Identification,* Van Nostrand Reinhold, New York, 1989, pp. 64, 85, 374 (No Month).

*Primary Examiner*—Mark L. Bell
*Assistant Examiner*—David Sample

[57] ABSTRACT

A process of preparing a crystalline porous solid selected from silicas and metallosilicates, such as, aluminosilicate zeolites or clathrasils. The process involves preparing a reaction mixture containing ammonia; water in a controlled concentration; a (hydrocarbyl)ammonium polysilicate hydrate salt; a mineralizer, such as ammonium fluoride; optionally, a source of a metal oxide, such as aluminum nitride; and optionally, a source of a charge-balancing cation or a structure directing agent; and maintaining the mixture at a temperature and for a time so as to produce the crystalline porous solid. A novel silica which is isostructural with zeolite P1 is prepared. Also prepared are a novel silica which is isostructural with zeolite beta and a novel TMA sodalite having a silica/alumina molar ratio between 12 and about 20.

20 Claims, No Drawings

SYNTHESIS OF CRYSTALLINE POROUS SOLIDS IN AMMONIA

BACKGROUND OF THE INVENTION

This invention relates to a process of synthesizing crystalline porous solids. More specifically, this invention relates to the synthesis of crystalline porous silicas and metallosilicates, such as silica molecular sieves, aluminosilicate zeolites, and for the purposes of this invention, clathrasils.

In other aspects, this invention pertains to novel compositions of zeolite P1, zeolite beta, and sodalite.

Crystalline porous silicas and metallosilicates find utility as supports for catalytic metals. Sodalite, for example, is useful as a catalyst support. Crystalline porous metallosilicates also have utility as heterogeneous catalysts in organic processes. For example, zeolite beta is useful as a catalyst in alkylating and transalkylating aromatic compounds and also useful as a catalyst in cracking, hydrocracking, and dewaxing hydrocarbons. Crystalline microporous solids are also employed as ion-exchangers and as sorbents for purifying gases. Zeolite beta, for example, is used as a sorbent for $C_8$ and $C_{10}$ alkylbenzene separations. Zeolite P1 is used in the separation of linear and branched hydrocarbons.

Crystalline porous solids are commonly prepared by hydrothermal methods. A typical preparation involves heating one or more nutrients, such as a source of silica, and optionally a source of a metal oxide, such as alumina, in water in the presence of a mineralizer and a structure directing agent until crystallization occurs. The mineralizer, which is typically hydroxide or fluoride, functions as a solubilizer of silica and metal oxides transporting them through the reactive solution or gel to nucleation sites. The structure-directing agent includes templates and stabilizers. The template, which may be a cation or neutral species, tends to favor the nucleation and growth of a particular zeolite. The stabilizer, often referred to as a pore filler, functions in a stabilizing role and may be required for a successful synthesis. Water and organic bases, such as primary, secondary, and tertiary aliphatic amines, and tetraalkylammonium halides are common stabilizers. Additionally, the template or stabilizer may assist in controlling pH and/or may provide charge balance with a counteranion or the anionic framework.

It is known that crystalline porous solids can be synthesized in water to which dilute aqueous or liquid ammonia has been added. U.S. Pat. Nos. 4,452,907 and 4,452,908, for example, disclose processes for the preparation of crystalline aluminosilicates, such as MFI zeolites, involving mixing a source of silica, a source of alumina, a source of an alkali metal (MOH), water, and a source of ammonium ions, such as ammonia or an ammonium salt, in the absence of alcohol or alkylene oxide, and maintaining the reaction at elevated temperature for a period such that crystallization occurs. The molar composition of the reaction mixture is taught as follows:

$SiO_2$: $Al_2O_3$ greater than 12:1

MOH: $Al_2O_3$ from 1:1 to 20:1

$SiO_2$: $NH_3$ from 1:1 to 200:1

$H_2O$: MOH from 30:1 to 300:1 based on the above and as shown in the examples, the reaction mixture is predominantly aqueous.

U.S. Pat. No. 4,717,560 discloses a hydrothermal process for preparing zeolite ECR-5 of the cancrinite structure involving forming a mixture containing aqueous ammonia, a source of silica, a source of alumina, and sodium hydroxide, and aging the reaction gel until crystallization occurs. It is taught that aqueous ammonia is present in the reaction mixture generally in an amount from about 15 to about 50 mole percent, based on total moles of water, and preferably, in an amount from 20 to 30 mole percent. It is further taught that "[t]he ECR-5 product may be formed in reaction mixtures containing more than 30 mole percent ammonia. However, such high ammonia controls typically mandate pressurization of the reactor."

D. E. W. Vaughan and K. G. Strohmaier report in the *Proceedings of the 9th International Zeolite Conference*, Montreal, 1992, Eds. R. von Ballmoos et al., 1993, Butterworth-Heinemann, that zeolites can be synthesized in aqueous ammonia solvents. Cancrinite products are reported up to an ammonia/water molar ratio of 3; however, no crystalline products are recovered from liquid ammonia, because the solubilities of the reagents are too low. The examples typically employ an ammonia/water ratio of 0.4.

In hydrothermal syntheses the composition and structure of the products obtained are limited to those products whose precursor polysilicates and polymetallates are readily stabilized by water solvation. It would be desirable to have an alternative reaction environment for growing crystalline porous solids which stabilizes novel precursor polysilicates and polymetallates such that crystalline porous solids of novel composition and structure are formed. It would also be desirable to employ in the syntheses of crystalline porous solids novel reagents which form reactive intermediate species.

In addition to the above, it would be advantageous to synthesize crystalline porous solids directly in an ammonium form, rather than a metal ion, e.g. sodium, form. The advantage relies on the fact that usually the catalytically active form of these solids is the acid form. When the solid is synthesized as a metal ion salt, it must be ion-exchanged with aqueous acid solution to obtain the acid form. When, however, the solid is synthesized in the ammonium form, it need only be heated to drive off ammonia to obtain the acid form.

Even though the advantages of alternative reaction environments are recognized, the prior art does not teach the synthesis of crystalline porous solids in concentrated ammonia. Instead, as shown in U.S. Pat. No. 4,717,560 and in the reference of Vaughan and Strohmaier, op. cit., the disadvantages of working in ammonia are set forth. Chief among these disadvantages is the low solubility of common sources of reactive silica.

In other aspects, R. Szostak reports in *Molecular Sieves: Principles of Synthesis and Identification,* Van Nos trand Reinhold, New York, 1989, p. 64, that zeolite Ns-P1 is known with silica/alumina molar ratios between 2 and 8. U. Håkansson and L. Fälth report in *Acta. Cryst.,* C46, 1363–1364 (1990), the synthesis of zeolite Na-P1 is having a Si/Al atomic ratio of 3.47 ($SiO_2Al_2O_3$ molar ratio of 6.94). The crystalline structure of Na-P1 is further discussed by Ch. Baerlocher and W. M. Meier, in *Zietschrift für Kristallographie,* Bd. 135, S. 339–354 (1972). Disadvantageously, the composition of zeolite P1 is limited to low $SiO_2/Al_2O_3$ molar ratios from 2 to about 8.

R. Szostak also reports in *Molecular Sieves: Principles of Synthesis and Identification,* op. cit., p. 64, that zeolite beta is known with $SiO_2/Al_2O_3$ molar ratios between 5 and 100. U.S. Pat. No. 4,840,929 disclosed zeolite beta having $SiO_2/Al_2O_3$ molar ratios up to 1500. M. Newsam et al. in *Proceedings of the Royal Society of London,* A 420, 375–405 (1988). These references are silent with regard to an all-silica beta composition, The synthesis of zeolite beta by traditional hydrothermal methods is also known as disclosed in U.S. Pat. Nos. 4,923,690 and 5,164,170. Disadvantageously, one method produces only partially crystallized beta, while the other method requires a seed crystal, Use of seed crystals is not preferred, In yet another aspect, zeolite sodalite can be prepared by hydrothermal methods, as taught in the following references: R. M. Barter and P. J. Denny, *Journal of the Chemical Society*, 971–982 and 983–1000 (1961); and R. M. Barter and D. E. Mainwaring, *Journal of the Chemical Society, Dalton*, 2534–2546 (1972). Normal sodalite crystallizes with a $SiO_2/Al_2O_3$ molar ratio of 2; however, a silica-rich sodalite is known having a $SiO_2/Al_2O_3$ molar ratio of 9.5, as reported by R. Aiello and R. H. Barter in the *Journal of the Chemical Society* (A), 1470–1475 (1970). Disadvantageously, the silica/alumina molar ratio is limited to values of between 2 and about 10.

SUMMARY OF THE INVENTION

In one aspect, this invention is a process of preparing a crystalline porous solid selected from the group consisting of silicas and metallosilicates. The process comprises preparing a reaction mixture containing:

(a) ammonia, (b) water in an amount such that the molar ratio of ammonia to water is between about 4 and about 26, (c) one or more nutrients comprising a (hydrocarbyl)ammonium polysilicate hydrate salt, and optionally, a source of a metal oxide which is reactive in the reaction mixture, and optionally, a source of an additional cation which is reactive in the reaction mixture, the nutrients being present in amounts sufficient to prepare the crystalline porous solid, and (d) a mineralizer in an amount sufficient to mineralize the nutrients, and thereafter maintaining the resulting mixture at a temperature and for a time sufficient to produce the crystalline porous silica or metallosilicate.

For the purposes of this invention, a "crystalline porous solid" is defined as a solid which possesses a defined and ordered crystalline framework structure, in this case of silica or metallosilicate, extending in two or three dimensions and having within the framework an array of channels, pores, or cages. The channels or pores can be one, two, or three dimensional and can be distributed throughout the crystalline solid in a regular or irregular fashion. The two and three dimensional channels can be isolated or interconnected. The channels or pores may be classified as micropores or mesopores, wherein by definition a micropore ranges in size from about 4 Å to no greater than 20 Å in cross-sectional dimension, and a mesopore ranges in size from greater than 20 Å to about 200 Å in cross-sectional dimension. Alternatively, the pores or channels may be interlayered or interstitial spaces within the crystalline framework.

If cages are present, they may be accessible via pores or channels. Alternatively, the cages may be isolated without interconnecting pores or channels, and therefore, inaccessible. Typically in the prior art, crystalline solids containing isolated cages are not considered to be porous. However, solids containing isolated cages can be made porous by thermal or chemical treatment. Such treatments introduce pores or channels which create accessibility to the cages. For the purposes of this invention, crystalline solids containing isolated cages will fall within the scope of the term "porous".

The process of this invention provides a general method of preparing a crystalline porous solid in a reaction mixture containing predominantly ammonia. Surprisingly, the process of this invention produces novel crystalline porous solids unknown heretofore. Accordingly, the process of this invention offers the opportunity to develop novel compositions otherwise unavailable from hydrothermal methods. In addition, the process of this invention is suitable for growing crystalline porous solids of known composition.

As an additional advantage, the ammonia can be removed from the reaction mixture by simple venting at room temperature. If desired, the vented ammonia can be recovered and recycled. Even more advantageously, the crystalline porous solids may be obtained directly in the ammonium form. Conversion to the active acid form is effected simply by heating; hence ion-exchange with aqueous acid solutions and its concomitant waste treatment problems may be avoided.

In another aspect, this invention is a novel crystalline microporous silica, designated hereinafter as DCM-7, which is represented by the composition:

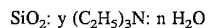

wherein y is a number ranging from 0 to about 0.5 and n is a number ranging from 0 to about 1. DCM-7 is isostructural with zeolite P1, as determined by X-ray diffraction (XRD). The phrase "DCM-7 is isostructural with zeolite P1" means that DCM-7 has the same crystalline structure, i.e. the same XRD pattern, as zeolite P1. Unlike zeolite P1 which heretofore has been prepared with $SiO_2/Al_2O_3$ molar ratios ranging only from 2 to 8, the aforementioned crystalline microporous silica of this invention contains less than 50 parts per million (ppm) by weight alumina. This low level of alumina corresponds to a $SiO_2/Al_2O_3$ molar ratio of greater than 34,000. DCM-7 is useful as a catalyst support and may be useful as a sorbent for the separation of branched and linear hydrocarbons.

In a third aspect, this invention is a novel crystalline microporous silica, hereinafter designated DCM-8, which is represented by the composition:

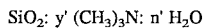

wherein y' is a number ranging from 0 to about 0.5 and n' is a number ranging from 0 to about 1. DCM-8 is isostructural with zeolite beta, as determined by XRD. Unlike zeolite beta which heretofore has been prepared with $SiO_2/Al_2O_3$ molar ratios ranging from 20 to 1500, the novel zeolite beta of this invention contains less than 50 ppm by weight of alumina, likewise corresponding to a $SiO_2/Al_2O_3$ molar ratio of greater than 34,000. DCM-8 is useful as a catalyst support and as a sorbent.

In a fourth aspect, this invention is a novel crystalline porous aluminosilicate, hereinafter designated DCM-9, which is represented by the composition:

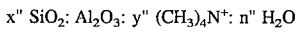

wherein x" is a number ranging from 12 to about 20, y" is about 2.0, and n" is a number ranging from about 1 to about 5. DCM-9 is isostructural with sodalite, as determined by XRD. Unlike sodalites which heretofore have been prepared with $SiO_2/Al_2O_3$ molar ratios ranging only from 2 to 10, the novel sodalite of this invention has a $SiO_2/Al_2O_3$ molar ratio ranging from 12 to about 20. Zeolite DCM-9 is useful as a catalyst support.

DETAILED DESCRIPTION OF THE INVENTION

The process of this invention provides a general method of preparing a crystalline porous solid in a reaction mixture that is predominantly ammonia. The solids are selected from the group consisting of silicas and metallosilicates.

In one preferred embodiment, this invention is a process of growing a crystalline porous silica. The process comprises preparing a mixture containing (a) ammonia, (b) water such that the ammonia/water molar ratio ranges between 5 and about 26, (c) a (hydrocarbyl)ammonium polysilicate hydrate salt, and (d) a mineralizer in an amount sufficient to mineralize the polysilicate salt. Thereafter, the resulting mixture is maintained at a temperature and for a time sufficient to produce the crystalline porous silica.

In another preferred embodiment, this invention is a process of growing a crystalline porous aluminosilicate. The process comprises preparing a mixture containing (a) ammonia, (b) water such that the ammonia/water molar ratio ranges between 5 and about 26, (c) nutrients comprising a (hydrocarbyl)-ammonium polysilicate hydrate salt, a source of alumina, and a source of a charge balancing cation, the nutrients being present in amounts sufficient to produce the crystalline porous solid, and (d) a mineralizer in an amount sufficient to mineralize the nutrients. Thereafter the mixture is maintained at a temperature and for a time sufficient to produce the crystalline porous aluminosilicate. In a more preferred embodiment, the source of alumina is aluminum nitride.

In even more preferred embodiments, this invention is a process of growing a crystalline porous silica or aluminosilicate, as described hereinabove, wherein the mineralizer is fluoride.

In a related aspect, this invention is a process of preparing a crystalline porous solid according to any of the above-identified methods wherein the synthesis mixture also contains one or more structure-directing agents. In another related aspect, this invention is a process of preparing a crystalline porous solid according to any of the above-identified methods wherein the synthesis mixture further contains a secondary source of silica as described hereinafter.

Any of the known crystalline porous silicas and metallosilicates can be prepared by the process of this invention. Non-limiting examples of suitable crystalline compounds containing isolated cages include clathrasils, such as dodecasil 3-C, dodecasil 3-T, dodecasil I-H, and octadecasil. Other suitable crystalline porous compounds include silica molecular sieves, layered aluminosilicates, and aluminosilicate zeolites, non-limiting examples of which include felspars, such as pure silica sodalite and silicas of the pentasil family, such as silicalite and pure silica ferrierite; and aluminosilicate zeolites X, Y, mordenite, MCM-22, ferrierite, L, omega, beta, P1, and the MFI (or ZSM) family, including ZSM-5, ZSM-11, ZSM-12, and the like. Analogous metallosilicates, including gallosilicates, titanosilicates, borosilicates, and the like, can also be prepared by the process of this invention. Unexpectedly, novel crystalline porous silicas and metallosilicates can also be prepared by the process of this invention, including for example, a silica-rich sodalite and silicas which are isostructural with zeolite P1 and zeolite beta.

The process of this invention comprises forming a reaction mixture containing ammonia, water, a (hydrocarbyl)ammonium polysilicate hydrate salt, a mineralizer, optionally, a reactive source of a metal oxide, and optionally a source of an additional cation, and maintaining the reaction mixture at a temperature and for a time sufficient to form the porous crystalline solid. The reaction mixture can be generally represented by about the following composition in terms of mole ratios of oxides:

| | |
|---|---|
| $NH_3/SiO_2$ | 10–1000 |
| $NH_3/H_2O$ | 4–26 |
| $H_2O/SiO_2$ | 0.4–250 |
| $Z/SiO_2$ | 0.04–0.50 |
| $MO_{n/2}/SiO_2$ | 0–1 | wherein Z represents the mineralizer, $MO_{n/2}$ represents the metal oxide, and n represents the valence of the metal M. At the amounts of metal oxide which are employed, the polysilicate hydrate salt can provide the necessary amount of charge-balancing cations.

Typically, ammonia is supplied to the reaction mixture as an anhydrous liquid. The amount of ammonia which is employed can vary widely. Generally, the ratio of moles of ammonia to moles of silicon varies from about 10 to about 1000, and preferably, from about 20 to about 35.

Ammonia possesses several properties which are especially advantageous for the formation of crystalline porous solids. Specifically, ammonia may act as a solvent or may act as a template or stabilizer. Accordingly, the addition of a separate template or stabilizer may not be required. Of course, in those instances where a template or stabilizer other than ammonia is required, that required compound may be added to the reaction mixture. As a further advantage, ammonia is a source of ammonium ions which may act as charge-balancing cations in the structure formed. As charge-balancing cations, ammonium ions have advantages over alkali or alkaline earth ions. When the as-synthesized form contains alkali or alkaline earth ions, the solid must be ion-exchanged with acid to obtain the active catalytic or sorbent form. By contrast, when the as-synthesized form contains ammonium ions, the solid need only be heated driving off ammonia to obtain the active acid form.

A mineralizer is also required for the process of this invention. Mineralizers (or solubilizers) are well-known in the art to increase the solubility of nutrients in the reactive medium as well as to transport nutrients to nucleation sites, processes which are referred to as mineralization . Mineralizers may be construed to be "catalysts" in that they are consumed on dissolution of the inorganic nutrients in the reactive media and usually regenerated when the crystalline porous solid is formed. Examples of suitable mineralizers include fluoride and hydroxide bases. If a hydroxide base in aqueous solution is used, then care must be taken to maintain an ammonia/water molar ratio within the range required of the process of this invention, as noted hereinbelow. The preferred mineralizer is fluoride.

Any source of fluoride which is reactive in the reaction mixture is suitable for the process of this invention, including ammonium fluoride, hydrogen fluoride, sodium bifluoride, ammonium hexafluorosilicate, and hydrocarbylammonium fluorides, such as tetramethylammonium fluoride, tetraethylammonium fluoride, benzyltrimethylammonium fluoride, dipropylammonium fluoride, and isopropylammonium fluoride. Alternatively, alkali metal fluoride salts, such as sodium fluoride, can be used provided that such salts are reactive in the reaction mixture. Preferably, the source of fluoride is ammonium fluoride, hydrogen fluoride, sodium fluoride, sodium bifluoride, or ammonium hexafluorosilicate. More preferably, the source of fluoride is ammonium fluoride.

As a general procedure, ammonia is added to a mixture of the nutrients, the mineralizer, and optionally the charge-balancing cation, the structure-directing agent, and water, and then the mixture is maintained at a temperature and for a time sufficient to form the crystalline porous solid. It will be apparent to those skilled in the art that the nutrients employed will depend upon the specific crystalline porous solid desired. For example, silicas will require a source of silica; whereas, metallosilicates will require a source of silica, a source of metal oxide, and a source of a charge-balancing cation.

Prior art sources of silica, such as alkali silicates and silica gels, are not readily mineralized in solutions containing predominantly ammonia. Unexpectedly, it has now been discovered that (hydrocarbyl)ammonium polyhedral polysilicate hydrates, can be mineralized in solutions containing predominantly ammonia, and therefore these salts provide a suitable source of reactive silica. The identification and preparation of (hydrocarbyl)ammonium polysilicate hydrate salts are described by D. Hoebbel et al. in *Z. anorg. allg. Chem.*, 384, 43–52 (1971); ibid., 465, 15 (1980); ibid., 494, 31–42 (1982), relevant sections of which are incorporated herein by reference. Among the polysilicate ions described therein are $Si_6O_{15}^{-6}$, $Si_8O_{20}^{-8}$, and $Si_{10}O_{25}^{-10}$. Preferably, the polysilicate ion is $Si_6O_{15}^{-6}$ or $Si_8O_{20}^{-8}$. These ions are prepared with tetra(hydrocarbyl)ammonium cations, such as, tetramethylammonium, tetraethylammonium, tetrapropylammonium, tetrabutylammonium, and benzyltrimethylammonium. Preferably, the counterion is tetramethylammonium, tetraethylammonium, or benzyltrimethylammonium. The polysilicate is generally obtained as a hydrate. For example, $(NR_4)_6Si_6O_{15}$ can be crystallized with 19.5 moles water of hydration. The polysilicate $(NR_4)_8Si_8O_{20}$ crystallizes with 20–30 moles of water when $NR_4^+$ is tetramethylammonium and with 9–18 moles of water when $NR_4^+$ is benzyltrimethylammonium.

It has also been found that common sources of silica may be employed in the reaction mixture along with the (hydrocarbyl)ammonium polysilicate hydrate. Non-limiting examples of these secondary sources of silica include amorphous silicas, porous and dense phase silicas, alkali metasilicates, amorphous aluminosilicates, crystalline dense phase aluminosilicates, crystalline porous aluminosilicates, modified zeolites and molecular sieves, as well as, analogous other metallosilicates. In addition, silicon alkoxides, silicon nitrides, and silicon alkyls are also suitable. Preferred among these secondary sources of silica are zeolites X, Y, A, mordenite, ferrierite, and beta, and their corresponding acid forms. Secondary sources of silica are employed in an amount ranging from about 1 to about 20 weight percent based on the total weight of polysilicate hydrate and alumina sources present.

It is noted that the crystalline porous solid produced in the process of this invention will possess a crystalline structure which is different from the structure of the secondary source of silica. For example, if zeolite Y is used as a secondary source of silica, the product produced will have a structure different from zeolite Y. Likewise, if a metallosilicate, such as an aluminosilicate, is used as a source of metal oxide, such as alumina, the structure of the product produced will differ from the structure of the metallosilicate.

The mineralization of the source of silica depends upon the ratio of mineralizer to silica in the reaction mixture. Generally, this ratio ranges between about 0.04 and about 0.50, more preferably, between about 0.06 and about 0.20. Above the upper ratio of 0.5, when the mineralizer is fluoride, the predominant species formed is hexafluorosilicate ion which precipitates from the reaction mixture. Below the lower ratio of 0.04, mineralization of the silica may be slow.

As noted hereinbefore, a metal oxide may be required in the process of this invention. Non-limiting examples of suitable metal oxides include the metal oxides of Groups 2 through 14 of the Periodic Table of the Elements, published and copyrighted by CRC Press, Inc., 1994. Preferably, the metal oxide is selected from the group consisting of the metal oxides of aluminum, gallium, titanium, zirconium, vanadium, magnesium, boron, iron, nickel, cobalt, phosphorus, and mixtures thereof. More preferably, the metal oxide is an oxide of aluminum, boron, gallium, or titanium. Most preferably, the metal oxide is alumina.

Any source of metal oxide is acceptable for the process of this invention provided that the source is reactive in the reaction mixture. Suitable sources of metal oxide include the elemental metals, metal nitrides, metal hydrides, metal alkoxides, metal halides, metal phosphates, amorphous and crystalline metal oxides, and metallosilicates, as well as organometallic compounds, such as metal alkyls. For the most preferred metal oxide, which is alumina, suitable sources include aluminum nitride, aluminum metal, aluminum hydride, aluminum alkoxides, aluminum halides, aluminum phosphates, amorphous and crystalline aluminas, aluminates, and aluminosilicates. Preferably, the source of alumina is aluminum nitride or porous aluminosilicates. More preferably, the source of alumina is aluminum nitride, heretofore unknown as a reagent for the production of crystalline porous solids.

The amount of metal oxide employed in the process of this invention can vary widely. Specifically, the molar ratio of metal oxide to silica in the reaction mixture, derived from the source of silica and the source of metal oxide, can range from 0 to 1. (The corresponding silica to metal oxide molar ratio ranges from 1 to infinity.) When the metal oxide/silica ratio is 0, a siliceous material is obtained containing less than 1000 ppm metal oxide. On the other hand, the presence of metal oxide in the reaction mixture does not ensure that the corresponding metal will be incorporated into the crystalline porous solid which is formed. In those cases where the metal oxide is a desired part of the product, the molar ratio of metal oxide to silica in the reaction mixture preferably ranges between about 0.01 and about 0.25.

Additional cations may also be added to the reaction mixture. The cations may function in a charge-balancing capacity or as structure-directing agents. Non-limiting examples of additional cations include the alkali (Group 1), alkaline earth (Group 2), and transition metal ions of the Periodic Table. Any source of these additional cations may be employed provided that the source can be solubilized in the reaction mixture. Suitable sources of these cations include the carbonate, halide, sulfate, nitrate, acetate, silicate, aluminate, phosphate, oxalate, and carboxylic salts.

Other charge-balancing or structure-directing agents may also be added to the reaction mixture. Ammonia, itself, can act as a template or stabilizer and a source of charge-balancing ammonium ions. Alternatively, ammonium ions can be introduced into the reaction mixture as the silicate, aluminate, phosphate, halide, sulfate, nitrate, acetate, oxalate, or carboxylate salt. Other suitable sources include alkylammonium salts, such as the halides, preferably wherein each alkyl group contains from 1 to about 20 carbon atoms, and more preferably, from 1 to about 6 carbon atoms. Illustrative of these cations are tetramethylammonium, tetraethylammonium, isopropylammonium, dipropylammonium, tetrapropylammonium, tetrabutylammonium, benzyltrimethylammonium, and the like, typically available as the halides. Another source of structure-directing agents and charge-balancing ions includes alkylamines, which can serve as precursors to the in situ formation of alkylammonium ions.

Any amount of structure-directing agent is suitable provided that a crystalline porous solid is formed. Typically, the molar ratio of structure-directing agent to total framework-forming elements excluding oxygen (silicon and metal, e.g., aluminum) ranges in the reaction mixture from about 0 to about 2, more preferably, from about 0.5 to about 2.0. Charge-balancing cations should be added in an amount sufficient to provide overall charge neutrality in the crystalline porous solid.

While the intention of this invention is to grow crystalline porous solids in a reaction medium which is predominantly ammonia, the presence of water in the reaction medium is not excluded. For the purposes of this invention the molar ratio of ammonia to water must be equal to or greater than about 4. Preferably, the ammonia/water molar ratio is greater than about 5, more preferably, greater than about 6, even more preferably, greater than about 7. Preferably, the ammonia/water molar ratio is no greater than about 26. Most preferably, the ammonia/water molar ratio ranges between about 7 and about 26 corresponding to an ammonia concentration between about 88 and about 96 mole percent, based on the total moles of ammonia and water. By contrast, saturated aqueous ammonium hydroxide contains between about 25 and 30 mole percent ammonia, based on the total moles of ammonia and water. It is noted that the ammonia/water molar ratio measures the water which is added to the reaction mixture either as free water or as combined water, such as water of crystallization or water adsorbed on the reagents. Once the reaction mixture is prepared, however, it is usually not known whether the water remains as free water or combined water or whether the water is removed by reaction with one of the reagents.

If desired, a seed crystal may be added prior to closing the reactor. Seed crystals are employed in the reaction mixture in an amount ranging from about 0.01 to about 20 weight percent based on the total weight of other silica and alumina sources. Seed crystals direct the synthesis of a composition which is identical to the seed crystal.

The nutrients, mineralizer, optional charge-balancing cation and structure-directing agent, any additional water, and seed crystals can be mixed in any order provided that a crystalline porous solid is later produced. The order of addition of the components may determine the crystalline product formed. For example, when a mixture containing polysilicate ions and a lesser amount of zeolite Y is added to a mixture containing ammonium fluoride and aluminum nitride, and then anhydrous ammonia is added, an all-silica beta zeolite is formed. If the polysilicate is first added to aluminum nitride, then zeolite Y is added, and thereafter ammonium fluoride and anhydrous ammonia are sequentially added, zeolite P1 is formed.

After the nutrients and other components are added to the reactor, the reactor is cooled to a temperature between about −60° C. and −30° C. and liquid ammonia is transferred into the reactor. Thereafter, the reactor is maintained at a temperature and pressure sufficient to effect nucleation and precipitation of the crystalline porous solid. Reactor contents are usually not stirred or agitated. Any reactor designed to withstand high pressure is suitable for the process of this invention, including stainless steel, Hastaloy™, or teflon-lined reactors.

The temperature of the process can vary from the boiling point of ammonia (−30° C.) to any higher temperature, so long as the reactor can handle the pressure generated. As a general rule, the temperature ranges between about 0° C. and 200° C. preferably between about 100° C. and about 180° C., and more preferably, between about 130° C. and about 160° C. Pressure is autogenous, and typically ranges from several hundred to several thousand psig. Below 130° C. anhydrous ammonia is in the liquid phase, while above 130° C. anhydrous ammonia is a supercritical fluid. In the process of this invention the supercritical transition temperature will vary depending upon the specific composition of the reaction mixture. Since the pressure curve in the supercritical phase increases dramatically with small increases in temperature, pressure vessels should be rated accordingly. Crystallization times range from about 1 to about 15 days, and preferably, from about 2 to about 9 days.

The products of the process of this invention are crystalline porous solids, preferably crystalline microporous and mesoporous solids, suitable examples of which are noted hereinabove. Among the products produced are novel compositions including an all-silica microporous solid designated DCM-7 and represented by the molar composition:

$$SiO_2: y\ (C_2H_5)_3N: n\ H_2O$$

wherein y is a number ranging from 0 to about 0.5 and n is a number ranging from 0 to about 1. DCM-7 exhibits an XRD pattern whose characteristic reflections for Cu-Kα radiation are listed in Table 1.

TABLE 1

| X-ray Diffraction Pattern of DCM-7, (Cu—Ka) | |
|---|---|
| D-Spacing | Relative Intensity ($I/I_0$) |
| 7.09 ± 0.2 | 50.0 |
| 4.97 ± 0.2 | 33.8 |
| 4.07 ± 0.2 | 36.0 |
| 3.51 ± 0.2 | 25.5 |
| 3.18 ± 0.2 | 100.0 |
| 2.97 ± 0.2 | 28.2 |
| 2.68 ± 0.2 | 28.9 |
| 2.45 ± 0.2 | 9.6 |
| 2.36 ± 0.2 | 8.8 |
| 2.25 ± 0.2 | 8.0 |
| 2.09 ± 0.2 | 7.8 |
| 2.05 ± 0.2 | 11.8 |
| 1.98 ± 0.2 | 11.9 |
| 1.96 ± 0.2 | 11.3 |
| 1.78 ± 0.2 | 16.9 |
| 1.72 ± 0.2 | 15.9 |

The pattern shown in Table 1 is essentially identical to the pattern given for zeolite P1 by R. von Ballmoos and J. B. Higgins, eds., in *Zeolites: Collection of Simulated X-Ray Diffraction Powder Patterns for Zeolites,* Butterworth-Heineman, Stoneham, MA, 1990, p. 406B. The water and triethylamine (TEA) molecules occupy the void spaces within the crystalline structure and can be removed by heating.

Another novel product of the process of this invention is a crystalline microporous solid designated DCM-8 represented by the molar composition:

$$SiO_2: y'\ (CH_3)_3N: n'\ H_2O$$

wherein y' is a number ranging from 0 to about 0.5 and n' is a number ranging from 0 to about 1. DCM-8 exhibits an XRD pattern whose characteristic reflections for Cu-Kα radiation are listed in Table 2.

TABLE 2

X-ray Diffraction Pattern of DCM-8, (Cu Kα)

| D-Spacing | Relative Intensity (I/I$_0$) |
|---|---|
| 12.31 ± 0.2 | 34.9 |
| 11.31 ± 0.2 | 49.4 |
| 8.57 ± 0.2 | 3.1 |
| 7.39 ± 0.2 | 3.9 |
| 6.56 ± 0.2 | 8.4 |
| 6.07 ± 0.2 | 6.7 |
| 5.53 ± 0.2 | 1.9 |
| 4.93 ± 0.2 | 3.4 |
| 4.79 ± 0.2 | 4.1 |
| 4.16 ± 0.2 | 18.8 |
| 3.96 ± 0.2 | 100 |
| 3.61 ± 0.2 | 5.8 |
| 3.52 ± 0.2 | 15.6 |
| 3.43 ± 0.2 | 5.4 |
| 3.28 ± 0.2 | 14.5 |
| 3.11 ± 0.2 | 11.8 |
| 3.02 ± 0.2 | 13.0 |
| 2.95 ± 0.2 | 5.5 |
| 2.90 ± 0.2 | 4.2 |
| 2.74 ± 0.2 | 3.4 |
| 2.69 ± 0.2 | 8.9 |
| 2.58 ± 0.2 | 2.5 |
| 2.49 ± 0.2 | 4.2 |
| 2.41 ± 0.2 | 3.4 |
| 2.35 ± 0.2 | 1.2 |
| 2.26 ± 0.2 | 1.0 |
| 2.19 ± 0.2 | 1.2 |
| 2.13 ± 0.2 | 1.4 |
| 2.08 ± 0.2 | 13.4 |
| 2.05 ± 0.2 | 2.4 |
| 1.97 ± 0.2 | 1.8 |
| 1.91 ± 0.2 | 2.1 |
| 1.88 ± 0.2 | 2.4 |
| 1.84 ± 0.2 | 3.2 |
| 1.783 ± 0.2 | 2.0 |
| 1.782 ± 0.2 | 2.2 |
| 1.753 ± 0.2 | 3.4 |
| 1.713 ± 0.2 | 1.8 |

The XRD pattern shown in Table 2 is essentially identical to the pattern listed for zeolite beta by R. Von Ballmoos and J. B. Higgins, eds., in *Zeolites: Collection of Simulated X-Ray Powder Patterns for Zeolites*, op. cit., p. 514S. The aluminum concentration of the novel composition is less than 50 ppm, as determined by X-ray fluorescence. Upon calcination, the trimethylamine is lost and the composition reduces to:

SiO$_2$: n' H$_2$O wherein n' ranges from 0 to about 0.05.

A third novel product of the process of this invention is a crystalline microporous solid designated DCM-9 represented in the as-synthesized form by the molar composition:

X" SiO$_2$: Al$_2$O$_3$: y" (CH$_3$)$_4$N$^+$: N" H$_2$O wherein x" is a number ranging from 12 to about 20, y" is about 2.0, and n" ranges from about 1 to about 5. DCM-9 exhibits an XRD pattern whose characteristic reflections for Cu-Kα radiation are listed in Table 3.

TABLE 3

X-ray Diffraction Pattern of DCM-9, (Cu Kα)

| D-Spacing | Relative Intensity (I/I$_0$) |
|---|---|
| 6.28 ± 0.2 | 33 |
| 4.45 ± 0.2 | 40 |
| 3.96 ± 0.2 | 8 |
| 3.63 ± 0.2 | 100 |
| 2.82 ± 0.2 | 14 |
| 2.57 ± 0.2 | 19 |
| 2.38 ± 0.2 | 3 |
| 2.23 ± 0.2 | 6 |
| 2.10 ± 0.2 | 10 |
| 1.90 ± 0.2 | 8 |
| 1.75 ± 0.2 | 17 |

The XRD pattern shown in Table 3 is essentially identical to the pattern listed for TMA-sodalite by R. Von Ballmoos and J. B. Higgins, eds., in *Zeolites: Collection of Simulated X-Ray Powder Patterns for Zeolites*, op. cit., p. 479S.

The following examples are illustrative of the process and compositions of this invention, but should not be construed to be limiting thereof.

PREPARATION OF TETRAETHYLAMMONIUM POLYSILICATE HYDRATE OF COMPOSITION [(C$_2$H$_5$)$_4$N]$_6$[Si$_6$O$_{15}$]·nH$_2$O

A solution comprising 35 weight percent tetraethylammonium hydroxide (TEAOH, 1L) is heated to 80°–90° C., and fumed silica (144 g, Aerosil® grade) is added with vigorous stirring. The mixture is stirred for several hours until clear, then cooled to ambient temperature, and refrigerated. A large mass of waxy solid is collected by filtration. The solids are dried over calcium sulfate in a desiccator for about 3 weeks, and then ground into a powder to yield [(C$_2$H$_5$)$_4$N]$_6$[Si$_6$O$_{15}$]·n$_{H2}$O. The degree of hydration is determined by thermal gravimetric analysis (TGA).

EXAMPLE 1

Synthesis of Crystalline Porous Silica DCM-7

A reaction mixture is prepared by mixing tetraethylammonium polysilicate (TEADDR) hydrate of composition C$_{48}$H$_{120}$N$_6$SiO$_{15}$·19.5 H$_2$O (193 g; 0.125 mole TEADDR; 2.44 moles H$_2$O), synthesized as described hereinabove, with ammonium fluoride (4.6 g. 0.124 mole). The mixture is transferred to a stainless steel autoclave (1L) and cooled to −50° C. To the mixture, liquid ammonia (383 g, 22.5 moles) is added, and the contents are well mixed. The reactor is sealed, removed from the cold bath, and left standing for 2 hr. The NH$_3$/H$_2$O molar ratio is 9.2 corresponding to 90 mole percent ammonia. Thereafter, the reactor is heated to 150° C. over a 3 hr period, and allowed to stand at that temperature for 5 days. The internal pressure rises to 1500 psig over the course of the reaction. The reactor is then cooled to ambient temperature, the ammonia is vented, and the reactor is purged with nitrogen. A dry powder is removed from the reactor, washed with water, and dried at 85° C. Analysis by XRD (Cu Karadiation), as set forth in Table 1, shows that the solid is isostructural with zeolite Na-P1. The molar composition of the product, as synthesized, is:

SiO$_2$: 0.1 (C$_2$H$_5$)$_3$N: 0.6 H$_2$O

The water and triethylamine molecules comprise 13.1 wt percent and 11.9 wt percent, respectively, of the product, as determined by TGA, and occupy the void spaces within the crystalline structure. Water desorption occurs at about 100° C. and removal of triethylamine is achieved by calcination above 400° C.

Preparation of tetramethylammonium polysilicate hydrate of composition $[(CH_3)_4N]_8[Si_8O_{20}] \cdot nH_2O$ A 2.0M solution of tetramethylammonium hydroxide (TMAOH) is prepared by diluting a 25 weight percent solution of TMAOH (729.2 g) with deionized water to 1L volume. The solution is heated to 80°–90° C., and fumed silica (120 g, Aerosil® grade) is added in portions with strong stirring. The resulting cloudy solution is stirred for several hours at temperature until clear. The solution is cooled to ambient and refrigerated. Crystallization produces a large mass of colorless needles. The needles are collected by filtration, and the mother liquor is concentrated to two-thirds of the original volume by heating. A second crop of colorless crystals is collected, and the mother liquor is discarded. The crystals are dried over several days exposed to ambient or controlled humidity atmosphere. The dry, opaque/white solids are ground to a fine powder to yield $[(CH_3)_4N]_8[Si_8O_{20}] \cdot nH_2O$. The degree of hydration is determined by TGA and can be varied by controlling the relative humidity of the atmosphere during drying.

EXAMPLE 2

Preparation of Zeolite P1

A reaction mixture is prepared by mixing tetramethylammonium polysilicate (TMADVR) hydrate of composition $C_{32}H_{96}N_8Si_8O_{20} \cdot 30\ H_2O$ (125 g; 0.0745 mole TMADVR; 2.23 g $H_2O$), synthesized as described hereinabove, with aluminum nitride (12.2 g, 0.3 mole). To this mixture zeolite HY (15.4 g, Conteka CBV-720, 95 wt percent $SiO_2$, 5 wt percent $Al_2O_3$) is added, and thereafter ammonium fluoride (1.8 g, 0.048 mole) is added. The mixture is transferred into a stainless steel autoclave (1L), cooled to −50° C., and liquid ammonia (305 g, 17.9 moles) is added. The reactor contents are well mixed, and the reactor is sealed. The $NH_3/H_2O$ molar ratio is 7.8 corresponding to 89 mole percent ammonia. After about 2 hr, the reactor is heated to 150° C. over a 3–4 hr period with the internal pressure rising to near 1800 psig. After 5 days the reactor is cooled to ambient, the ammonia vented, and the reactor purged with nitrogen. A solid is collected, washed with an excess of water, and dried at 85° C. The solid is identified by XRD as zeolite P1, a crystalline porous aluminosilicate having a $SiO_2/Al_2O_3$ molar ratio of 4.8. As synthesized, the zeolite is in the tetramethylammonium form.

Preparation of benzyltrimethylammonium polysilicate hydrate of composition $[(C_7H_7)(CH_3)_3N]_8[Si_8O_{20}] \cdot nH_2O$ A 1.2M solution of benzyltrimethylammonium hydroxide (BTMAOH) is prepared by diluting 40 weight percent BTMAOH solution (500 g) with deionized water to 1L volume. The solution is heated to 80°–90° C., and fumed silica (72 g, Aerosil® grade) is added in portions while stirring vigorously. The mixture is stirred for about 40 min until clear, and then cooled to approximately 40° C. The solution is filtered, and the filtrate is concentrated to two-thirds volume by heating. After cooling to ambient and overnight refrigeration, a large mass of colorless plate-like crystals is obtained. The crystals are collected by filtration, and the mother liquor is concentrated to two-thirds volume by heating. A second crop of colorless crystals is collected, and the mother liquor discarded. The crystals are dried over several days exposed to ambient atmosphere, and then the dry, opaque/white solids are ground to a fine powder to yield $[(C_7H_7)(CH_3)_3N]_8[Si_8O_{20}] \cdot nH_2O$. The degree of hydration is determined by TGA.

EXAMPLE 3

Preparation of Dodecasil 3C

A reaction mixture is prepared in an autoclave (1L) by mixing benzyltrimethylammonium polysilicate (BTMADVR) hydrate of composition $C_{80}H_{128}N_8Si_8O_{20} \cdot 18\ H_2O$ (145.7 g; 0.07 mole BTMADVR; 1.3 moles $H_2O$), synthesized as described hereinabove, with ammonium fluoride (3.4 g, 0.09 mole). The mixture is cooled to −50° C., and liquid ammonia (286 g, 16.8 moles) is added. The contents are mixed, and the reactor is sealed. The $NH_3/H_2O$ molar ratio is 13 corresponding to 93 mole percent ammonia. After about 30 min., the reactor is heated to 150° C. over a 1.5 hr period. Internal pressure rises to between 1500 and 1600 psig. After 9 days the reactor is cooled, the ammonia vented, and the reactor purged with nitrogen. A white solid is recovered, washed with water, and dried at 85° C. The solid is identified by XRD as dodecasil 3C, a polyhedral cage-containing silica.

EXAMPLE 4

Preparation of Dodecasil 3C

A reaction mixture is prepared in an autoclave (1L) by mixing ammonium fluoride (3.2 g, 0.09 mole) with water (26.3 g, 1.46 moles). To the mixture is added benzyltrimethylammonium polysilicate (BTMADVR) hydrate of composition $C_{80}H_{128}N_8Si_8O_{20} \cdot 9\ H_2O$ (125 g; 0.065 mole BTMADVR; 0.59 moles $H_2O$), synthesized as described hereinabove The mixture is cooled to −50° C. and liquid ammonia (266 g, 15.6 moles) is added. The contents are mixed, and the reactor is sealed. The $NH_3/H_2O$ molar ratio is 7.6 corresponding to 88 mole percent ammonia. The reactor is heated to 150° C. Internal pressure rises to about 1200 psig. After 7 days the reactor is cooled, the ammonia vented, and the reactor purged with nitrogen. A white solid is recovered, washed with water, and dried at 85° C. The solid is identified by XRD as dodecasil 3C, a polyhedral cage-containing silica.

EXAMPLE 5

Preparation of Crystalline Porous Silica DCM-8

A first reaction mixture is prepared in an autoclave (1L) by mixing tetramethylammonium polysilicate (TMADVR) hydrate of composition $C_{32}H_{96}N_8Si_8O_{20} \cdot 28\ H_2O$ (125 g, 0.0673 mole TMADVR, 2.1 moles $H_2O$) with zeolite HY (15.4 g, Conteka CBV-720, 95 wt percent $SiO_2$, 5 wt percent $Al_2O_3$)- Aluminum nitride (12.5 g, 0.3 mole) and ammonium fluoride (1.9 g, 0.05 mole) are mixed together and then added to the first reaction mixture. The combined mixture is cooled to −50° C., and liquid ammonia (312 g, 18.31 moles) is added. The $NH_3/H_2O$ molar ratio is 8.4 corresponding to 89 mole percent ammonia. The contents are mixed, and the reactor is sealed. The reactor is heated to 150° C. Internal pressure rises to nearly 2500 psig. After 5 days the reactor is cooled, the ammonia vented, and the reactor purged with nitrogen. The solid product is washed with water and dried at 85° C. The XRD pattern, taken with Cu Kα radiation, is set forth in Table 2.

The data in Table 2 are consistent with DCM-8 being isostructural with zeolite beta. Elemental analysis indicates a composition comprising $$SiO_2: 0.1 (CH_3)_3N: 0.04 H_2O$$

The aluminum concentration is less than 50 ppm by weight, as determined by X-ray fluorescence. Upon calcination at 550° C. the composition reduces to $SiO_2: 0.05 H_2O$. The composition is stable in air at 800° C.

EXAMPLE 6

Preparation of Crystalline Porous Solid: DCM-9

A reaction mixture is prepared by mixing tetramethylammonium polysilicate (TMADVR) hydrate of the composition $C_{32}H_{96}N_8Si_8O_{20} \cdot 28 H_2O$ (143 g, 0.0875 mole TMADVR, 2.4 mole $H_2O$), synthesized as described hereinabove, with ammonium fluoride (4.6 g, 0.12 mole). Then, aluminum nitride (3.1 g, 0.076 mole) and HY zeolite (15 g, Conteka CBV-720, 95 wt percent $SiO_2$, 5 wt percent $Al_2O_3$) are added. The mixture is transferred to a stainless steel autoclave (1L), and cooled to −50° C. Liquid ammonia is added (384 g, 22.5 moles), and the contents are mixed and the reactor sealed. The $NH_3/H_2O$ molar ratio is 9.1 corresponding to 90 mole percent ammonia. After about 30 min the reactor is heated to 150° C. over a 1.5 hr period with the internal pressure rising to near 1400 psig. After 5 days the reactor is cooled, the ammonia vented, and the reactor purged with nitrogen. A powder is collected, washed with excess water, and dried at 85° C. The powder exhibits the XRD pattern shown in Table 3 and is identified as TMA-sodalite, a clathrasil cage-containing aluminosilicate having the composition:

$$16.9 \ SiO_2: Al_2O_3: 2.2 \ (CH_3)_4N^+: 1.7 \ H_2O$$

The $SiO_2/Al_2O_3$ molar is 16.9.

EXAMPLE 7

Preparation of Octadecasil

A reaction mixture is prepared by mixing tetramethylammonium polysilicate (TMADVR) hydrate of the composition $C_{32}H_{96}N_8Si_8O_{20} \cdot 31 H_2O$ (160 g, 0.094 mole TMADVR, 2.9 mole $H_2O$), synthesized as described hereinabove, with ammonium fluoride (4.6 g, 0.124 mole). The mixture is transferred to a stainless steel autoclave (1L), and cooled to −50° C. Liquid ammonia is added (384 g, 22.5 moles); the contents are mixed, and the reactor is sealed. The $NH_3/H_2O$ molar ratio is about 7.8 corresponding to 88 mole percent ammonia. After about 30 min, the reactor is heated to 150° C. over a 1.5 hr period with the internal pressure rising to near 1200 psig. After 9 days the reactor is cooled, the ammonia vented, and the reactor purged with nitrogen. A powder is collected, washed with excess water, and dried at 85° C. The powder is identified by XRD as octadecasil, a polyhedral cage-containing silica.

EXAMPLE 8

Preparation of Zeolite Na-1

Tetramethylammonium polysilicate hydrate of composition $[(CH_3)_4N]_8[Si_8O_{20}] \cdot 23H_2O$ (8.0 g), ammonium fluoride (0.12 g), and sodium fluoride (0.14 g) are loaded into an autoclave and cooled to −50° C. Liquid ammonia is added (21 g), the contents are mixed, and the reactor is sealed. The $NH_3/H_2O$ molar ratio is 6. The reactor is heated to 150° C. and maintained for 3 days. Thereafter, the reactor is cooled, and the ammonia is vented. A powder is collected and identified by XRD as zeolite Na-1, a clathrasil.

What is claimed is:

1. A process of preparing a crystalline porous solid selected from the group consisting of silicas and metallosilicates, the process comprising preparing a mixture containing:

(a) ammonia, (b) water in an amount such that the molar ratio of ammonia to water is greater than about 4 and less than about 26, (c) one or more nutrients comprising a (hydrocarbyl)ammonium polysilicate hydrate salt, and optionally, a source of a metal oxide which is reactive in the reaction mixture, and optionally, a source of an additional cation which is reactive in the reaction mixture, the relative amounts of the nutrients being sufficient to form the crystalline porous solid, and (d) a mineralizer in an amount sufficient to mineralize the nutrient(s);

and maintaining the resulting mixture at a temperature and for a time sufficient to produce the crystalline porous silica or metallosilicate.

2. The process of claim 1 wherein the crystalline porous solid is selected from the group consisting of clathrasils, felspars, layered aluminosilicates, aluminosilicate molecular sieves, and silica molecular sieves.

3. The process of claim 1 wherein the molar ratio of ammonia to silicon ranges between about 10 and about 1000.

4. The process of claim 1 wherein the mineralizer is a fluoride ion.

5. The process of claim 4 wherein the fluoride is obtained from a source of fluoride selected from the group consisting of ammonium fluoride, hydrogen fluoride, sodium fluoride, sodium bifluoride, and ammonium hexafluorosilicate.

6. The process of claim 1 wherein the molar ratio of mineralizer to silica ranges between about 0.04 and about 0.50.

7. The process of claim 1 wherein the metal oxide is selected from the group consisting of the oxides of aluminum, gallium, titanium, magnesium, boron, iron, nickel, cobalt, vanadium, zirconium, phosphorus, and mixtures thereof.

8. The process of claim 1 wherein the metal oxide is alumina which is obtained from a source of alumina selected from the group consisting of aluminum metal, aluminum nitride, aluminum hydride, aluminum alkoxides, aluminum halides, aluminum phosphates, amorphous and crystalline aluminas, aluminate, and aluminosilicates.

9. The process of claim 1 wherein a source of an additional cation is employed as a charge-balancing cation or as a structure-directing agent.

10. The process of claim 1 wherein the ammonia/water molar ratio is greater than about 6 and less than about 26.

11. The process of claim 10 wherein the ammonia/water molar ratio ranges between about 7 and less than about 26.

12. The process of claim 1 wherein a secondary source of silica is present and is selected from the group consisting of crystalline and amorphous silicas, metallosilicates, amorphous and crystalline aluminosilicates, and aluminosilicate molecular sieves.

13. The process of claim 12 wherein the aluminosilicate molecular sieve is selected from the group consisting of zeolites X, Y, A, mordenite, ferrierite, and beta.

14. The process of claim 1 wherein the temperature ranges between about 0° C. and about 200° C.

15. The process of claim 14 wherein the temperature ranges between about 100° C. and about 180° C.

16. The process of claim 1 wherein a seed crystal is added to the reaction mixture.

17. A process for the formation of a crystalline porous silica comprising preparing a mixture containing:
   (a) ammonia,
   (b) water in an amount such that the molar ratio of ammonia to water is greater than about 5 and less than about 26,
   (c) a (hydrocarbyl)ammonium polysilicate hydrate salt in an amount sufficient to prepare the crystalline porous silica, and
   (d) a fluoride mineralizer in an amount sufficient to mineralize the polysilicate salt,
and maintaining the resulting mixture at a temperature ranging between about 100° C. and about 180° C. for a time sufficient to produce the crystalline porous silica.

18. A process for the formation of a crystalline porous aluminosilicate comprising preparing a mixture containing:
   (a) ammonia, and
   (b) water in an amount such that the molar ratio of ammonia to water is greater than about 5 and less than about 26,
   (c) nutrients comprising a (hydrocarbyl)ammonium polysilicate hydrate salt, aluminum nitride, and optionally, a charge-balancing cation, in relative amounts sufficient to form the crystalline porous aluminosilicate; and
   (d) a fluoride ion mineralizer in an amount sufficient to mineralize the nutrients,
and maintaining the resulting mixture at a temperature ranging between about 100° C. and about 180° C. for a time sufficient to produce the crystalline porous aluminosilicate.

19. A process of preparing a crystalline porous solid selected from the group consisting of silicas and metallosilicates, the process comprising preparing a mixture containing:
   (a) ammonia,
   (b) water in an amount such that the molar ratio of ammonia to water is greater than about 4 and less than about 26,
   (c) one or more nutrients comprising a (hydrocarbyl)ammonium polysilicate hydrate salt wherein the polysilicate ion is selected from the group consisting of $Si_6O_{15}^{-6}$, $Si_8O_{20}^{-8}$, and $Si_{10}O_{25}^{-10}$, and optionally, a source of a metal oxide which is reactive in the reaction mixture, and optionally, a source of an additional cation which is reactive in the reaction mixture, the relative amounts of the nutrients being sufficient to form the crystalline porous solid, and
   (d) a mineralizer in an amount sufficient to mineralize the nutrient(s); and maintaining the resulting mixture at a temperature and for a time sufficient to produce the crystalline porous silica or metallosilicate.

20. A process of preparing a crystalline porous solid selected from the group consisting of silicas and metallosilicates, the process comprising preparing a mixture containing:
   (a) ammonia,
   (b) water in an amount such that the molar ratio of ammonia to water is greater than about 4 and less than about 26,
   (c) one or more nutrients comprising a (hydrocarbyl)ammonium polysilicate hydrate salt, aluminum nitride, and optionally, a source of an additional cation which is reactive in the reaction mixture, the relative amounts of the nutrients being sufficient to form the crystalline porous solid, and
   (d) a mineralizer in an amount sufficient to mineralize the nutrient(s); and maintaining the resulting mixture at a temperature and for a time sufficient to produce the crystalline porous silica or metallosilicate.

* * * * *